US008726181B2

(12) United States Patent
Sunagawa

(10) Patent No.: US 8,726,181 B2
(45) Date of Patent: May 13, 2014

(54) LOG-INFORMATION PROCESSING APPARATUS, LOG-INFORMATION PROCESSING METHOD, AND COMPUTER PROGRAM PRODUCT

(75) Inventor: Yuuki Sunagawa, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 717 days.

(21) Appl. No.: 12/430,530

(22) Filed: Apr. 27, 2009

(65) Prior Publication Data
US 2009/0293006 A1 Nov. 26, 2009

(30) Foreign Application Priority Data

May 21, 2008 (JP) ................................. 2008-132945
Mar. 16, 2009 (JP) ................................. 2009-063559

(51) Int. Cl.
*G06F 3/044* (2006.01)
(52) U.S. Cl.
USPC ........................................................ 715/772
(58) Field of Classification Search
USPC .................... 715/772, 773, 864, 866
See application file for complete search history.

(56) References Cited

U.S. PATENT DOCUMENTS

| 6,732,195 | B1 * | 5/2004 | Baldwin ............................ 710/6 |
| 6,766,016 | B2 | 7/2004 | Kojima et al. |
| 2003/0204341 | A1 * | 10/2003 | Guliani et al. ................... 702/60 |
| 2007/0008119 | A1 * | 1/2007 | Pohle et al. .............. 340/539.22 |

FOREIGN PATENT DOCUMENTS

| JP | 2001-154881 | 6/2001 |
| JP | 2002-49444 | 2/2002 |
| JP | 2004-249667 | 9/2004 |
| JP | 2006-94174 | 4/2006 |
| JP | 2006-343987 | 12/2006 |
| JP | 2007-76334 | 3/2007 |
| WO | WO 01/33358 A1 | 5/2001 |

OTHER PUBLICATIONS

Office Action issued Apr. 23, 2013 in Japanese Patent Application No. 2009-063559.

* cited by examiner

*Primary Examiner* — Thanh Vu
(74) *Attorney, Agent, or Firm* — Oblon, Spivak, McClelland, Maier & Neustadt, L.L.P.

(57) ABSTRACT

A log-information processing apparatus includes a first interface unit, a storage unit, and a control unit. The first interface unit is configured to be attached and removed to and from an image processing apparatus. When the first interface unit is connected to the image processing apparatus, the control unit performs initialization on units included in the log-information processing apparatus, acquires log information from the image processing apparatus via the first interface unit, and stores acquired log information in the storage unit.

15 Claims, 13 Drawing Sheets

```
2020-01-01  00:00:00 booting...!

ROM Monitor Revision 1.00

(arch x x x, cpu x x x x x, fpu x x x x x x )

compiled by '---' at JAN 1 2020 (00:00:00)

memory = xxxxx, clock = 1000.0Mhz, asic id = 1
```

LOG-INFORMATION PROCESSING APPARATUS, LOG-INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-132945 filed in Japan on May 21, 2008 and Japanese priority document 2009-063559 filed in Japan on Mar. 16, 2009.

BACKGROUND OF THE INVENTION

1. Field of the Invention

The present invention relates to a technology for acquiring log information about an image processing apparatus.

2. Description of the Related Art

In recent years, an image processing apparatus called a multifunction product (MFP) that has functions of a printer, a facsimile, a copier, and a scanner in one casing has been well known. Such an MFP includes a display unit, a print unit, and a read unit within one casing, and has applications corresponding to the functions of the printer, the facsimile, the copier, and the scanner whereby the MFP can be operated as each of the printer, the facsimile, the copier, and the scanner by switching between the applications.

Because such an image processing apparatus is operated by various applications and modules that execute an operation based on a computer program, a problem can occur in the image processing apparatus due to software defect. When a problem occurs due to software defect, it is difficult to analyze a cause of the problem from the appearance of the image processing apparatus, and therefore it is necessary to analyze log information that is stored upon an operation of software.

Because an analysis operation is often performed such that log information is acquired by using a personal computer (PC) connected to the image processing apparatus in which the problem occurs, it is necessary to secure an area where the PC is to be mounted. Therefore, it is difficult to perform the analysis operation at an office of the user, or the like, where the image processing apparatus is installed. Furthermore, because a work for connecting the PC to the image processing apparatus is troublesome and it takes a long time to start up the PC, it is difficult to use the PC, resulting in decrease in efficiency of trouble analysis.

Japanese Patent Application Laid-open No. 2006-94174 discloses a method of acquiring log information in which a portable nonvolatile memory, such as a universal serial bus (USB) memory or an integrated circuit (IC) card, is directly connected to an image processing apparatus and log information is stored in the portable nonvolatile memory, so that the log information can be acquired without connecting the PC to the image processing apparatus.

However, in the above method, because the image processing apparatus controls the log information to be written in the portable nonvolatile memory, the image processing apparatus needs to include a specialized computer program for writing the log information.

Moreover, because operation timing is different when an operation of acquiring the log information is being performed and when an operation other than the operation of acquiring the log information is being performed, there is concern that a bug (trouble) does not recur, and therefore the above method cannot be used for the purpose of trouble analysis in some cases. Specifically, although the image processing apparatus does not perform an operation relating to a sending operation of the log information before the operation of acquiring the log information is performed, the image processing apparatus performs preparation for a writing operation (the image processing apparatus performs configuration if the writing operation is to be performed on a USB memory) or performs the writing operation by using a predetermined data transfer method (bulk transfer, or the like) when the operation of acquiring the log information is performed. Therefore, timing at which a normal operation (image forming operation) is performed is affected by the operation relating to the sending operation of the log information.

SUMMARY OF THE INVENTION

It is an object of the present invention to at least partially solve the problems in the conventional technology.

According to an aspect of the present invention, there is provided a log-information processing apparatus including a first interface unit that is configured to be attached and removed to and from an image processing apparatus; a storage unit that stores therein information; and a control unit that, when the first interface unit is connected to the image processing apparatus, performs initialization on units included in the log-information processing apparatus, acquires log information from the image processing apparatus via the first interface unit, and stores acquired log information in the storage unit.

According to another aspect of the present invention, there is provided a log-information processing method implemented on a log-information processing apparatus. The log-information processing apparatus including a first interface unit that is configured to be attached and removed to and from an image processing apparatus; and a storage unit that stores therein information. The log-information processing method including performing initialization, when the first interface unit is connected to the image processing apparatus, on units included in the log-information processing apparatus; acquiring log information from the image processing apparatus via the first interface unit after initialization on units included in the log-information processing apparatus is completed; and storing acquired log information in the storage unit.

According to still another aspect of the present invention, there is provided a computer program product including a computer program stored in a computer-readable recording medium, the computer program containing computer program codes which when executed on a computer cause the computer to implement the above log-information processing method on a log-information processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
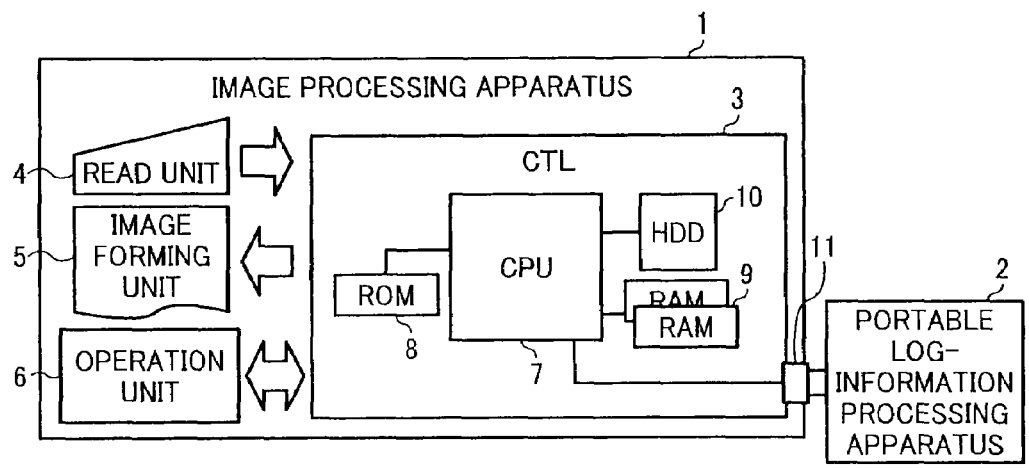
FIG. 1 is a block diagram of an image processing apparatus connected to a portable log-information processing apparatus according to a first embodiment of the present invention.
Figure 2:
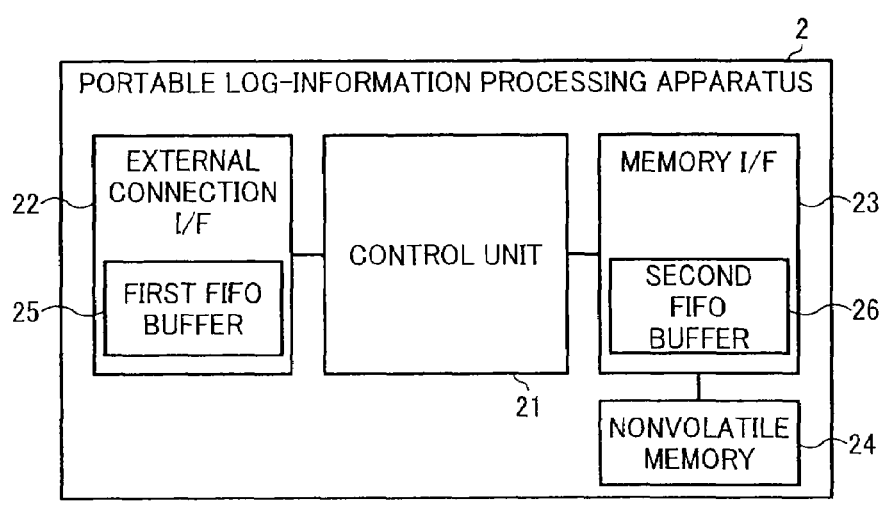
FIG. 2 is a block diagram of the portable log-information processing apparatus according to the first embodiment.

FIG. 1 is a block diagram of an image processing apparatus 1 connected to a portable log-information processing apparatus 2 according to a first embodiment of the present invention. FIG. 2 is a block diagram of the portable log-information processing apparatus 2.

The image processing apparatus 1 includes a controller (CTL) 3, a read unit 4, an image forming unit 5, and an operation unit 6. The CTL 3 controls the image processing apparatus 1. The CTL 3 includes a central processing unit (CPU) 7 that controls the CTL 3, a read-only memory (ROM) 8 in which various computer programs to be used when the CPU 7 is operated are stored, random access memories (RAMs) 9 that serve as a work area when the CPU 7 is operated, a hard disk drive (HDD) 10 in which image data is stored, and a connector 11 to which the portable log-information processing apparatus 2 is detachably attached.

The read unit 4 reads image of an original as image data in colors of red, green, and blue (RGB). The CPU 7 performs image processing, such as rotation, expansion, and compression, on the image data by using the RAM 9, and stores the processed image data in the HDD 10. The CPU 7 then performs processing such as combination and stamp on the stored data in accordance with settings received from the operation unit 6, converts the data into data in colors of cyan, magenta, yellow, and black (CMYK), and sends the converted data to the image forming unit 5. The image forming unit 5 prints out an image corresponding to the data on a recording medium. The operation performed by the CTL 3 is referred to as a normal operation. Although the image processing apparatus 1 has the configuration such that image data on an original (paper medium) is received from the read unit 4 and an image is printed out by the image forming unit 5, it is possible that the image processing apparatus 1 includes an input unit that receives electronic image data or has a configuration (scanner configuration) without the image forming unit 5.

The portable log-information processing apparatus 2 includes a control unit 21 that controls the portable log-information processing apparatus 2, an external connection interface (I/F) 22 that is connected to the control unit 21 and includes a first first-in first-out (FIFO) buffer 25, a memory I/F 23 that is connected to the control unit 21 and includes a second FIFO buffer 26, and a nonvolatile memory 24 that is connected to the memory I/F 23. The first FIFO buffer 25 is configured at multiple levels. The external connection I/F 22 corresponds to, although not limited to, a serial I/F.

A connector (not shown) of the external connection I/F 22 is connected to the connector 11 and is electrically connected to a signal line for log information output from the CPU 7. The external connection I/F 22 receives log information from the image processing apparatus 1 via the connector 11, and stores the received log information in the first FIFO buffer 25. The control unit 21 includes, for example, a CPU (not shown) and a RAM (not shown). When the external connection I/F 22 is connected to the image processing apparatus 1, the control unit 21 receives a connection signal from the external connection I/F 22 and performs configuration and initialization on units included in the portable log-information processing apparatus 2. Therefore, the image processing apparatus 1 does not need to perform the configuration and the initialization when the external connection I/F 22 is connected to the image processing apparatus 1 and only needs to perform an operation of outputting log information via the connector 11. Thus, the image processing apparatus 1 does not need to include a specialized computer program for writing data in an external device.

The control unit 21 controls peripheral devices such as the external connection I/F 22 and the memory I/F 23 (as to, for example, a write command, a display command, or default settings) and performs data transfer.

The memory I/F 23 writes and stores log information temporarily stored in the second FIFO buffer 26 in the nonvolatile memory 24.

The log information means records of processing performed by the CPU 7 (for example, contents of processing performed by an operating system (OS) and an application, and an error message). Analysis of the log information makes it possible to understand an internal processing state of the image processing apparatus 1 when an error occurs and analyze a reason for the error in an efficient manner. Essentially, the log information does not need to be output when the normal operation is performed. However, because nowadays the log information is required for an apparatus to analyze a reason for a trouble that occurs in an unexpected manner, the log information is output every time the apparatus is started up.

Figure 3:
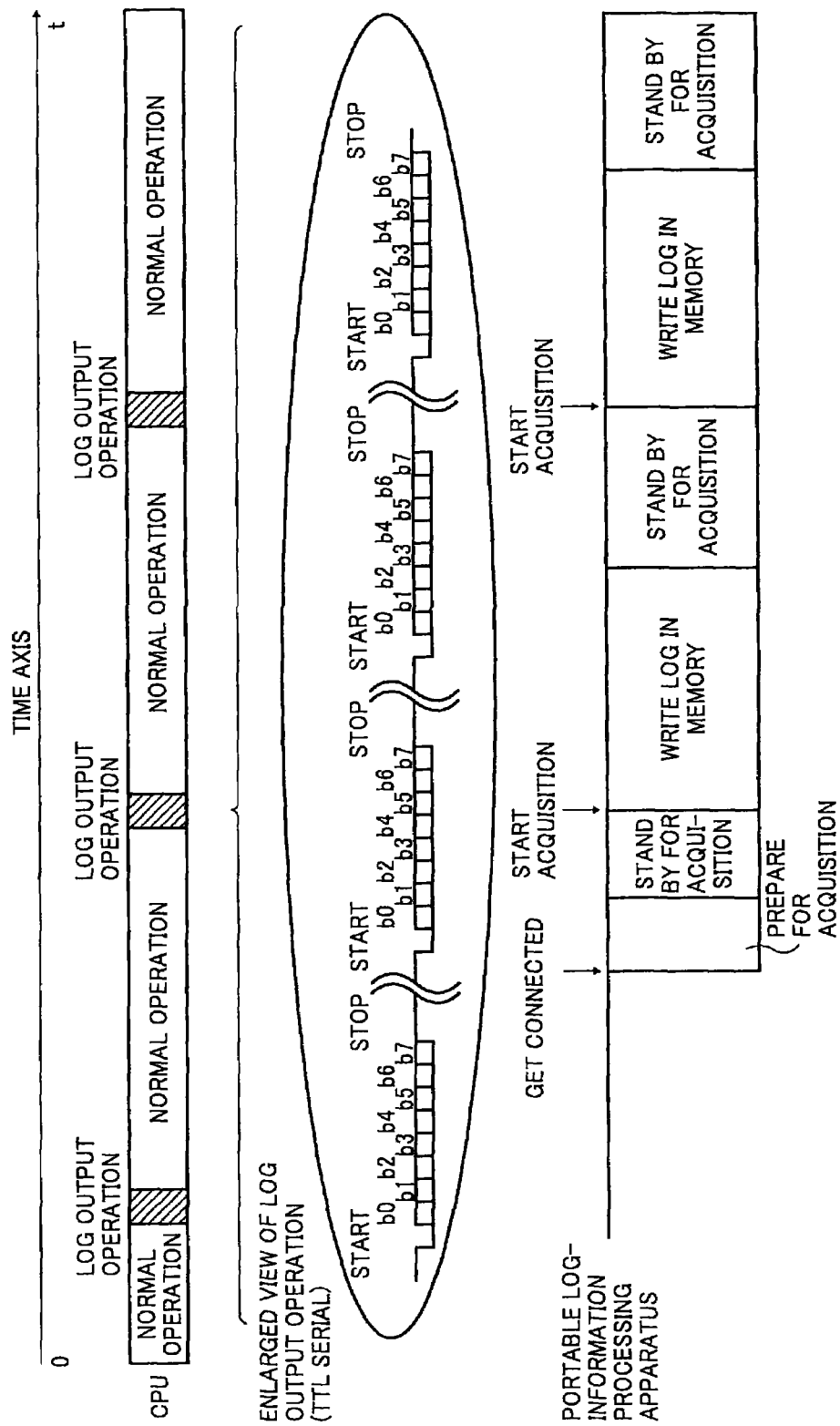
FIG. 3 is a timing chart for explaining an operation performed by the portable log-information processing apparatus according to the first embodiment from when log information is received from the image processing apparatus and to when the log information is stored in a nonvolatile memory shown in FIG. 2.
Figure 4:
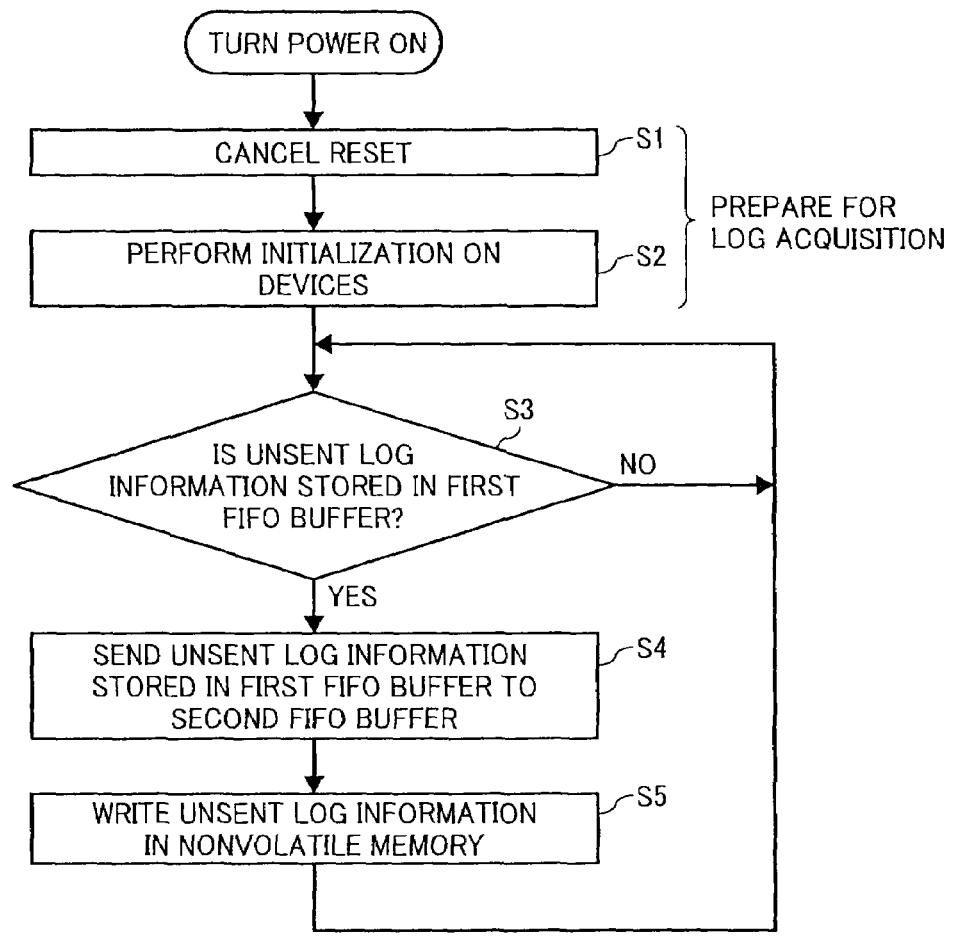
FIG. 4 is a flowchart of an operation performed by the portable log-information processing apparatus according to the first embodiment from when the log information is received from the image processing apparatus and to when the log information is stored in the nonvolatile memory.

FIG. 3 is a timing chart for explaining an operation performed by the portable log-information processing apparatus 2 from when the log information is received from the image processing apparatus 1 and to when the log information is stored in the nonvolatile memory 24. FIG. 4 is a flow chart of an operation performed by the portable log-information processing apparatus 2 from when the log information is received from the image processing apparatus 1 and to when the log information is stored in the nonvolatile memory 24.

As shown in FIG. 3, the CPU 7 performs an operation of outputting the log information between the normal operations. The CPU 7 performs the operation of outputting the log information at anytime in the same manner as it performs the normal operation. The log information is output by serial transfer via an output I/F (not shown) arranged inside the CPU 7 at predetermined timing as described below. In an example shown in FIG. 3, the log information is output in the order of a start bit, continuous 8 bits (b0 to b7) of data, and a stop bit. Because the image processing apparatus 1 does not perform a handshake with the portable log-information processing apparatus 2, the image processing apparatus 1 can perform the normal operation and output the log information without being affected by an operation of the portable log-information processing apparatus 2. Although debug log is output by a transistor-transistor-logic (TTL) serial signal, it is only an example of a format used for data transfer. As long as a format is determined in advance, parallel transfer can be employed instead of the serial transfer and a differential I/F can be used in an output method.

When the portable log-information processing apparatus 2 is connected to the connector 11, an electric power is supplied from the CTL 3 to the portable log-information processing apparatus 2 and then the operation shown in FIG. 4 is performed. The control unit 21 cancels reset of each of the units (Step S1), and performs initialization on devices, specifically, initialization on the peripheral devices, such as the external connection I/F 22 and the memory I/F 23, and initialization on the nonvolatile memory 24 (Step S2). The above operation is an operation of preparing for acquisition of log information.

When the initialization has been performed on the peripheral devices, the portable log-information processing apparatus 2 immediately enters a stand-by state to acquire log information. The stand-by state to acquire the log information is a state in which the portable log-information processing apparatus 2 can acquire the log information at anytime after the operation of preparing for acquisition of the log information is completed although the log information has not been written in the nonvolatile memory 24 (the log information has not been acquired). When the portable log-information processing apparatus 2 is in the stand-by state to acquire the log information, the log information output from the image processing apparatus 1 is immediately loaded into the first FIFO buffer 25. In the example shown in FIG. 3, after the start bit is detected, the continuous 8 bits of data are sequentially stored until the stop bit is detected.

As shown in FIG. 4, after the initialization is completed at Step S2, it is determined whether unsent log information is stored in the first FIFO buffer 25 (Step S3). If it is determined that the unsent log information is stored in the first FIFO buffer 25 (Yes at Step S3), the control unit 21 sends the unsent log information stored in the first FIFO buffer 25 to the second FIFO buffer 26 (Step S4). The control unit 21 then sends a send command to the memory I/F 23, and the memory I/F 23 writes the unsent log information stored in the second FIFO buffer 26 in the nonvolatile memory 24 (Step S5). The operation from Steps S3 to S5 is repeated.

A storage format such as a file format of the log information can be determined as appropriate. Furthermore, a buffer other than the FIFO buffer can be used. It is possible that an I/F such as a USB is arranged in the portable log-information processing apparatus 2, the portable log-information processing apparatus 2 is connected to a PC via the I/F, and the portable log-information processing apparatus 2 is used as a USB memory whereby the PC can acquire the log information from the portable log-information processing apparatus 2.

The portable log-information processing apparatus 2 has characteristics as described blow in (1) to (4).

(1) Because the portable log-information processing apparatus 2 acquires the log information and stores the log information in the nonvolatile memory 24, the image processing apparatus 1 does not need to include a specialized computer program for writing the log information.

(2) It is possible to acquire the log information without using the PC.

(3) It is possible to acquire the log information without affecting the normal operation of the image processing apparatus 1.

(4) Because the portable log-information processing apparatus 2 can be connected to the image processing apparatus 1 in an easy manner without using a cable, it is possible to acquire the log information quickly and easily.

Figure 5:
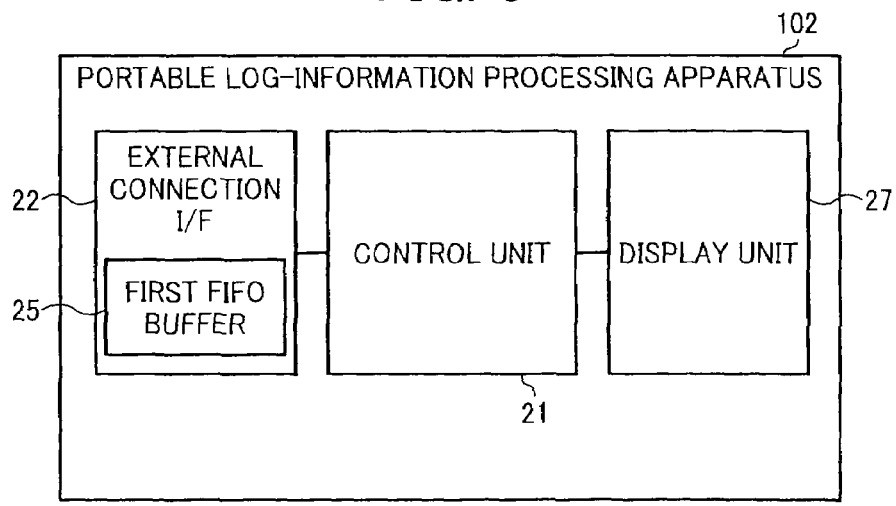
FIG. 5 is a block diagram of a portable log-information processing apparatus according to a second embodiment of the present invention.

FIG. 5 is a block diagram of a portable log-information processing apparatus 102 according to a second embodiment of the present invention. The same components as those shown in FIG. 2 are indicated with the same reference numerals. An image processing apparatus to which the portable log-information processing apparatus 102 and portable log-information processing apparatuses according to third to seventh embodiments of the present invention described later are connected is the same as the image processing apparatus 1.

The portable log-information processing apparatus 102 includes the control unit 21, the external connection I/F 22, and a display unit 27 connected to the control unit 21. The display unit 27 includes, for example, a liquid crystal display (LCD) (not shown) and an LCD controller (not shown). The LCD controller controls the log information acquired from the control unit 21 to be displayed on the LCD.

In the portable log-information processing apparatus 102, the log information is received from the image processing apparatus 1 via the external connection I/F 22 and the acquired log information is stored in the first FIFO buffer 25. The control unit 21 sends the log information stored in the first FIFO buffer 25 to the display unit 27, and the display unit 27 displays the log information.

Figures 6, 7:
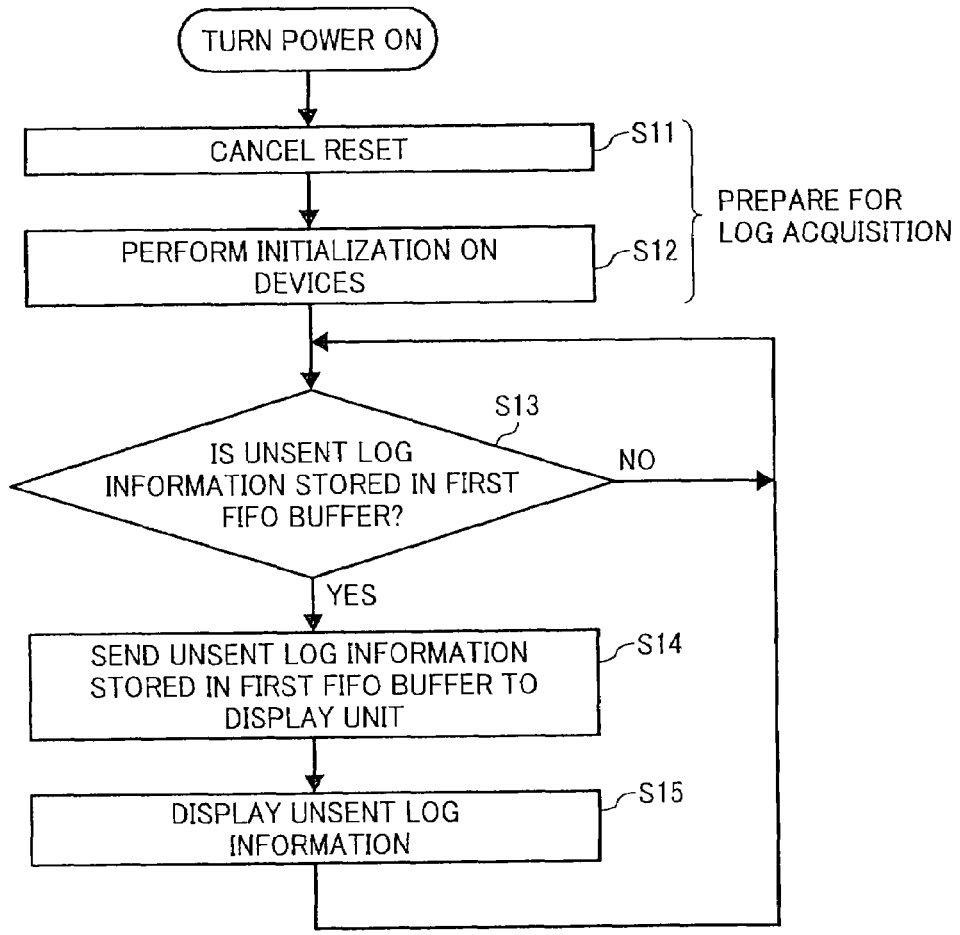
FIG. 6 is a flowchart of an operation performed by the portable log-information processing apparatus according to the second embodiment when the portable log-information processing apparatus is connected to the image processing apparatus.
FIG. 7 is an example of the log information displayed in a display unit shown in FIG. 5.

FIG. 6 is a flowchart of an operation performed by the portable log-information processing apparatus 102 when the portable log-information processing apparatus 102 is connected to the image processing apparatus 1. An operation performed at Steps S11 to S13 is the same as that performed at Steps S1 to S3 shown in FIG. 4. If the unsent log information is stored in the first FIFO buffer 25 (Yes at Step S13), the control unit 21 sends the unsent log information stored in the first FIFO buffer 25 to the display unit 27 (Step S14), and the display unit 27 displays the unsent log information (Step S15). The operation performed at Steps S13 to S15 is repeated.

FIG. 7 is an example of the log information displayed in the display unit 27. In this example, the log information is displayed in characters. The log information is displayed one line at a time from the bottom of a screen included in the display unit 27, and all of lines are scrolled up on the screen. If the log information is displayed at the top of the screen (the log information is displayed at the entire screen), the line at the top is deleted from the screen each time a new line is displayed at the bottom. If the log information is not sent to the display unit 27, the screen is maintained as it is.

Although the PC needs to be used to see the log information stored in the nonvolatile memory 24 according to the first embodiment, it is possible to see the log information without using the PC and affecting the operation of the image processing apparatus 1 according to the second embodiment.

Figure 8:
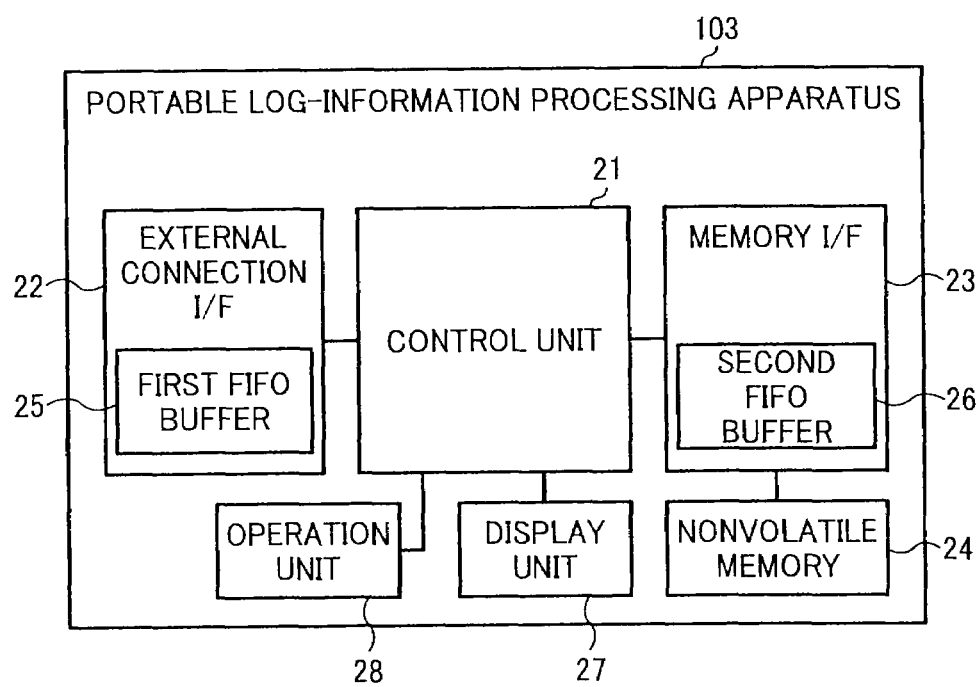
FIG. 8 is a block diagram of a portable log-information processing apparatus according to a third embodiment of the present invention.

FIG. 8 is a block diagram of a portable log-information processing apparatus 103 according to the third embodiment of the present invention. The same components as those shown in FIG. 2 or 5 are indicated with the same reference numerals. The portable log-information processing apparatus 103 includes the display unit 27 and an operation unit 28 in addition to the units included in the portable log-information processing apparatus 2. The operation unit 28 includes, for example, a switch (not shown) or a button (not shown) that can be operated by a user. A signal is input to the operation unit 28 by pressing the switch or the button.

Figure 9:
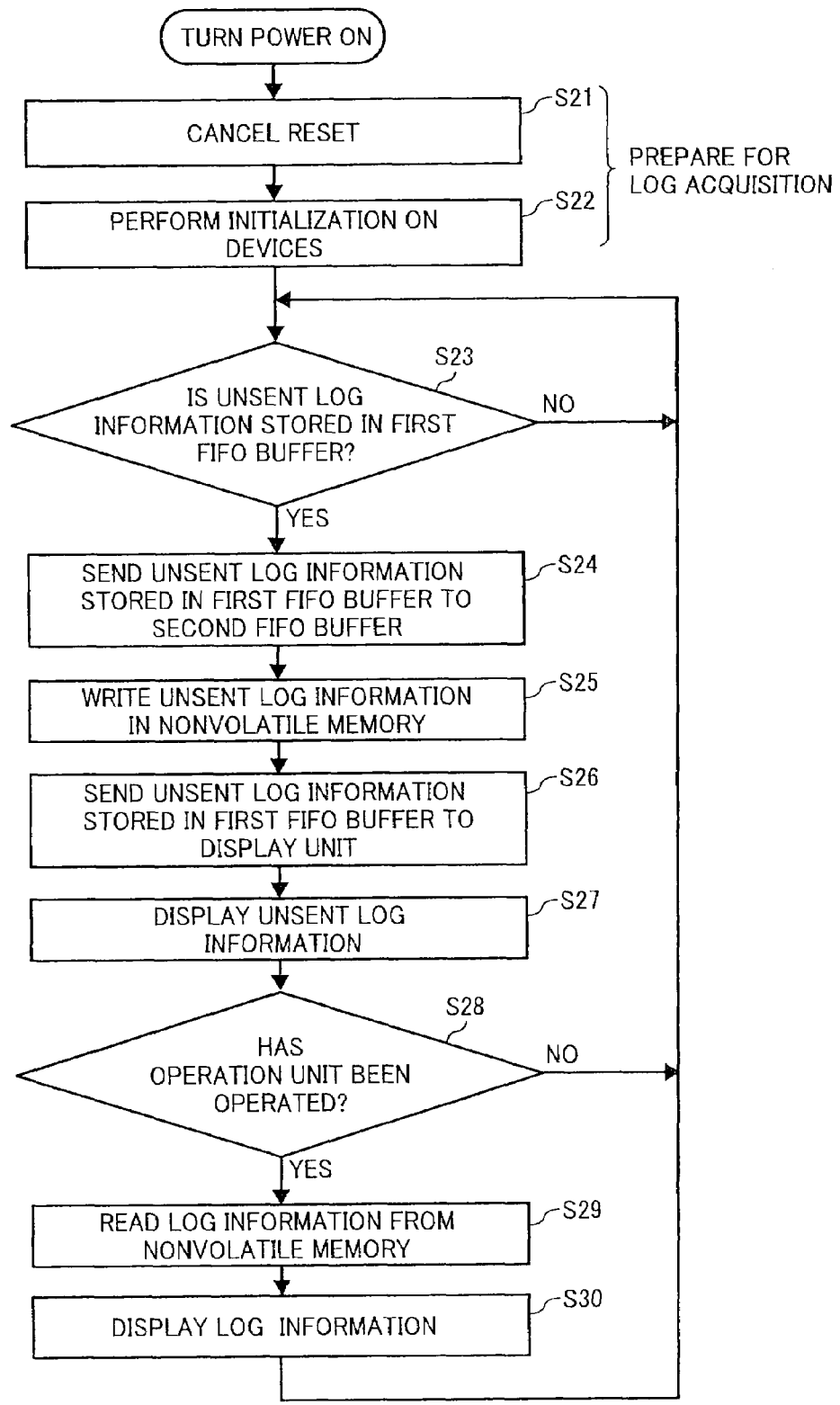
FIG. 9 is a flowchart of an operation performed by the portable log-information processing apparatus according to the third embodiment when the portable log-information processing apparatus is connected to the image processing apparatus.

FIG. 9 is a flowchart of an operation performed by the portable log-information processing apparatus 103 when the portable log-information processing apparatus 103 is connected to the image processing apparatus 1. An operation performed at Steps S21 to S23 is the same as that performed at Steps S1 to S3 shown in FIG. 4. If the unsent log information is stored in the first FIFO buffer 25 (Yes at Step S23), the control unit 21 sends the unsent log information stored in the first FIFO buffer 25 to the second FIFO buffer 26 (Step S24). The control unit 21 then sends a send command to the memory I/F 23, and the memory I/F 23 writes the unsent log information stores in the second FIFO buffer 26 in the nonvolatile memory 24 (Step S25). The control unit 21 then sends the unsent log information stored in the first FIFO buffer 25 to the display unit 27 (Step S26), and the display unit 27 displays the unsent log information (Step S27).

After the log information is stored in the nonvolatile memory 24, the control unit 21 determines whether the button included in the operation unit 28 has been pressed (Step S28). If it is determined that the button has been pressed (Yes at Step S28), the control unit 21 reads the log information from the nonvolatile memory 24 (Step S29), and the display unit 27 displays the read log information (Step S30). If it is not determined that the button has been pressed (No at Step S28), the process control returns to Step S23. Thus, it is possible to read the log information obtained prior to the log information displayed by the display unit 27 at Step S27 (the log information obtained in chronological past) from the nonvolatile memory 24 and display the read log information in the display unit 27.

For example, it is possible that displayed contents continuously return to previous ones while a predetermined button included in the operation unit 28 is pressed. A method of displaying previous log information can be achieved by reading log information from an address of the nonvolatile memory 24 in which previous log information is sequentially stored and sending the read log information to the display unit 27.

Furthermore, it is possible that the control unit 21 stores the log information read from the nonvolatile memory 24 in an internal RAM (not shown) and sends the log information to the display unit 27 by one line at constant time interval (for example, one second) while a predetermined button is pressed. The time interval can be changed for each button.

The operation performed at Steps S23 to S30 is repeated. Specifically, after the initialization has been performed, if the unsent log information is stored in the first FIFO buffer 25, the control unit 21 repeats the operation of controlling the memory I/F 23 to write the unsent log information in the nonvolatile memory 24, the operation of controlling the display unit 27 to display the unsent log information, and the operation of controlling the display unit 27 to display previous log information if the press of the button included in the operation unit 28 is detected.

Although there is a possibility that the user misses the log information because the log information can be seen only in real time according to the second embodiment, it is possible for the user to see the log information stored in the nonvolatile memory 24 according to the third embodiment. Therefore, there is no possibility that the user misses the log information and the log information can be analyzed without using the PC, so that analysis efficiency can be improved.

Figure 10:
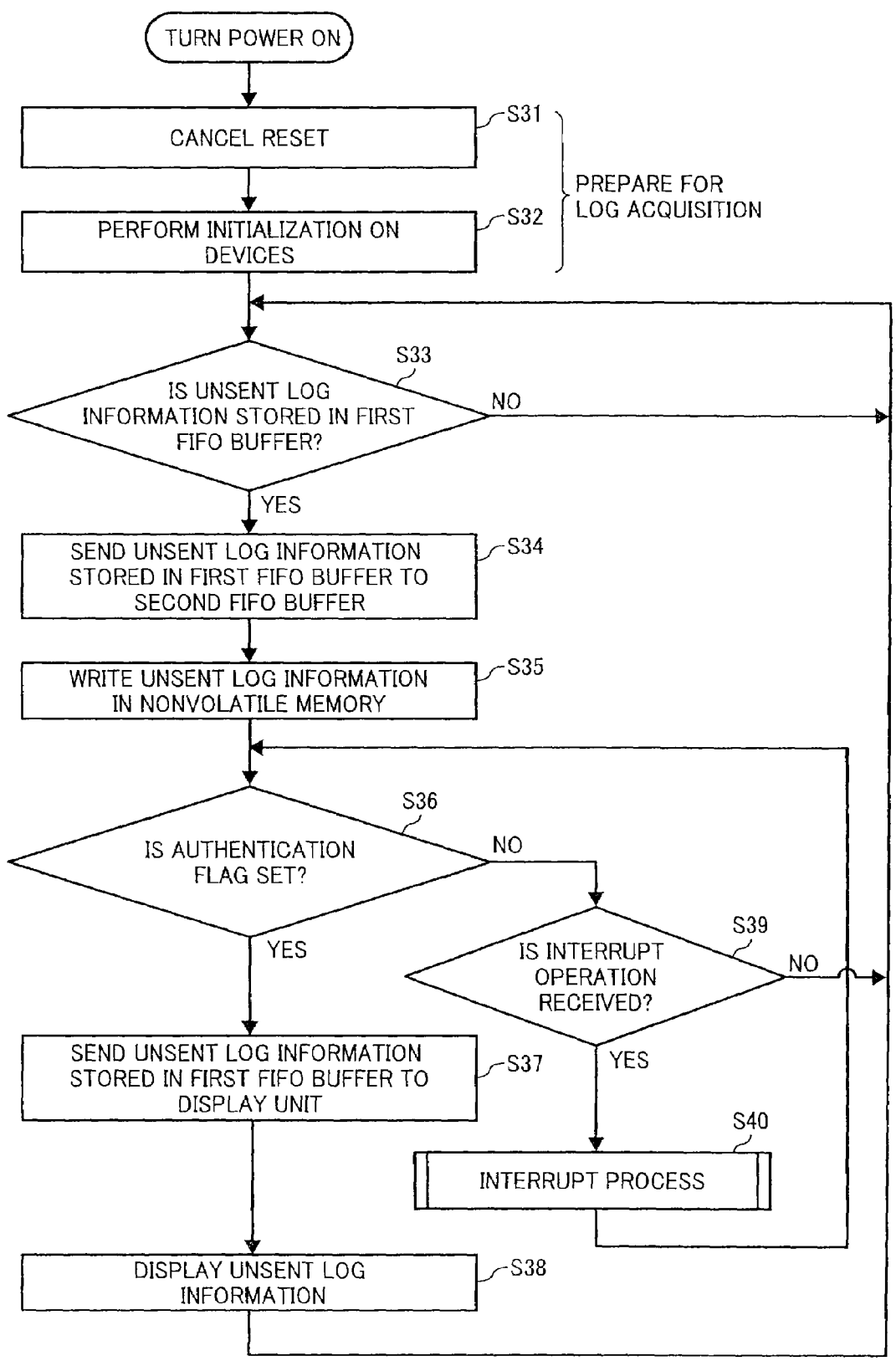
FIG. 10 is a flowchart of an operation performed by a portable log-information processing apparatus according to a fourth embodiment of the present invention when the portable log-information processing apparatus is connected to the image processing apparatus.

FIG. 10 is a flowchart of an operation performed by the portable log-information processing apparatus 103 according to the fourth embodiment of the present invention when the portable log-information processing apparatus 103 is connected to the image processing apparatus 1. In the fourth embodiment, display of the display unit 27 is turned on/off in accordance with a predetermined input operation received from the operation unit 28.

An operation performed at Steps S31 to S35 is the same as that performed at Steps S21 to S25 shown in FIG. 9. When the unsent log information is written in the nonvolatile memory 24 (Step S35), the control unit 21 reads an authentication flag stored in the nonvolatile memory 24, or the like, and determines whether the authentication flag is set (Step S36). If the authentication flag is set, it means that a bit for the authentication flag is set to "1", and if the authentication flag is not set, i.e., the authentication flag is cleared, it means that a bit for the authentication flag is set to "0". The configuration of the authentication flag is not limited to the one described above.

If the authentication flag is set (Yes at Step S36), the control unit 21 sends the unsent log information stored in the first FIFO buffer 25 to the display unit 27 (Step S37), and the display unit 27 displays the unsent log information (Step S38).

On the other hand, if the authentication flag is not set (No at Step S36), the control unit 21 determines whether an interrupt operation is received from the operation unit 28 by determining whether an event is received from the operation unit 28 (Step S39). If it is determined that the interrupt operation is received from the operation unit 28 (Yes at Step S39), the control unit 21 performs an interrupt process (Step S40) and the process control returns to Step S36. The interrupt process is performed to turn on/off the screen of the display unit 27 by receiving predetermined input from the operation unit 28, which will be explained in detail later.

On the other hand, if it is not determined that the interrupt operation is received from the operation unit 28 (No at Step S39), the process control returns to Step S33.

Figure 11:
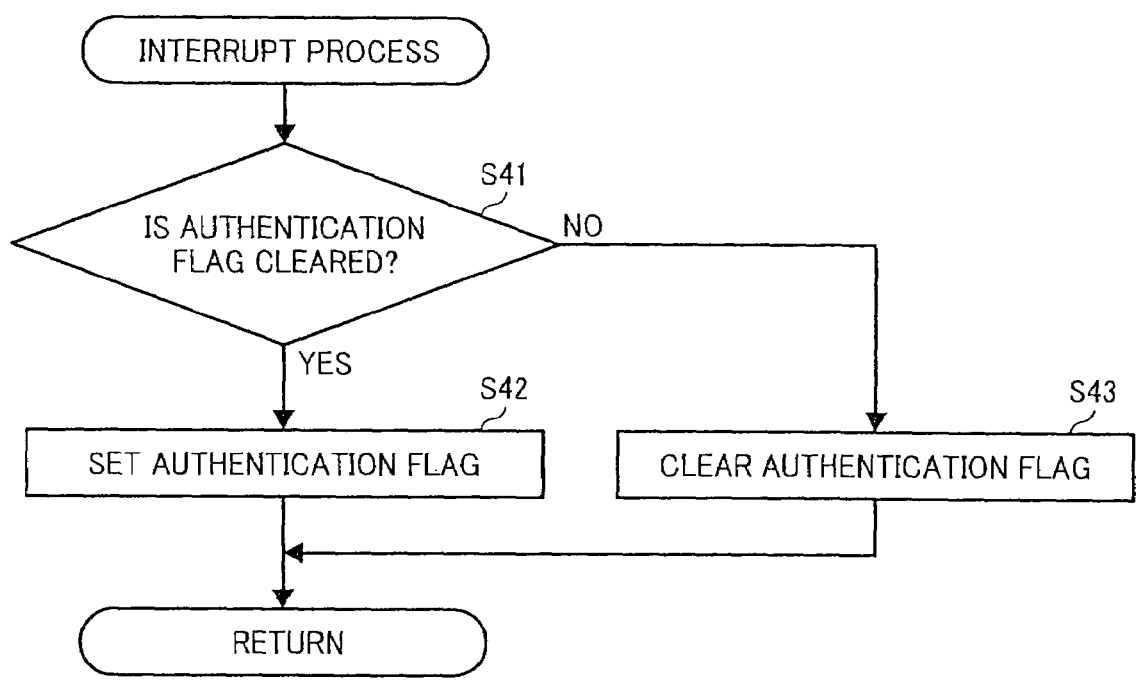
FIG. 11 is a flowchart of an interrupt process performed by the portable log-information processing apparatus according to the fourth embodiment.

FIG. 11 is a flowchart of the interrupt process performed by the portable log-information processing apparatus 103. If predetermined input is received from the operation unit 28, the control unit 21 determines whether the authentication flag is cleared (Step S41). If it is determined that the authentication flag is cleared (Yes at Step S41), the control unit 21 sets the authentication flag (Step S42). On the other hand, if it is determined that the authentication flag is set (No at Step S41), the control unit 21 clears the authentication flag (Step S43).

Any method can be employed to display the screen, i.e., to receive predetermined input from the operation unit 28. For example, four buttons a to d (the number of buttons can be arbitrarily determined) are arranged in the operation unit 28, and when the buttons c and d are continuously pressed while the buttons a and b are pressed, the authentication flag is set, so that the screen is displayed. Moreover, functions such as "Back" and "Space" in displayed contents are provided by concurrently pressing all buttons included in the operation unit 28 whereby operability is improved. Furthermore, it is possible to control the screen to return to the one in which the log information is being acquired.

Moreover, it is possible that not only the screen is simply turned on/off by setting or clearing the authentication flag with predetermined input from the operation unit 28 but also a current status is checked by the user using the display unit 27 in a manner such that the user can easily recognize it.

Figure 12A:
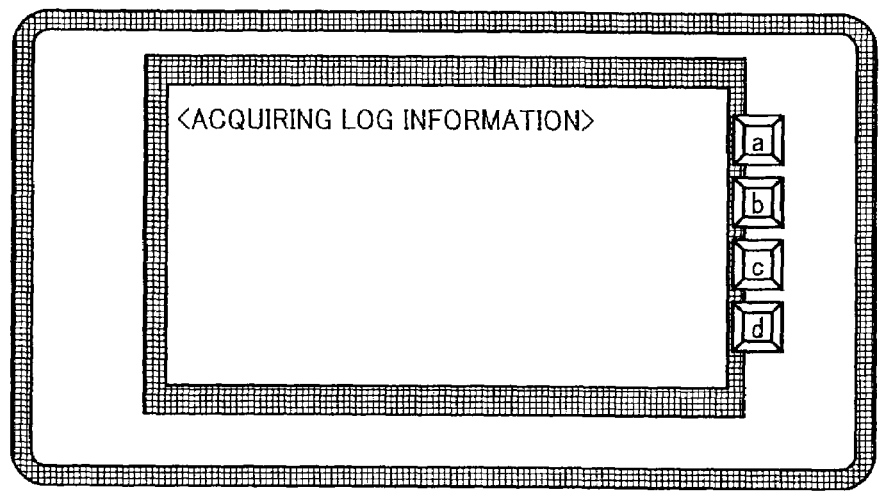
FIGS. 12A to 12C are examples of a screen displayed in the display unit.
Figure 12B:
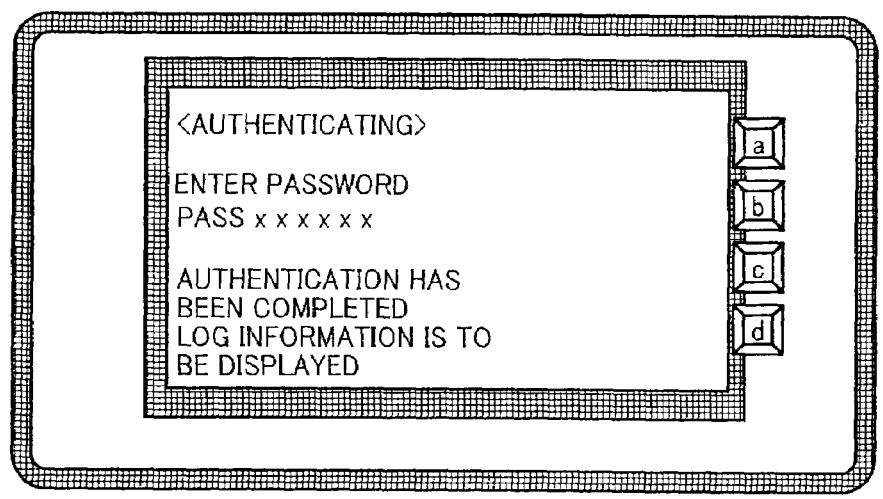
Figure 12C:
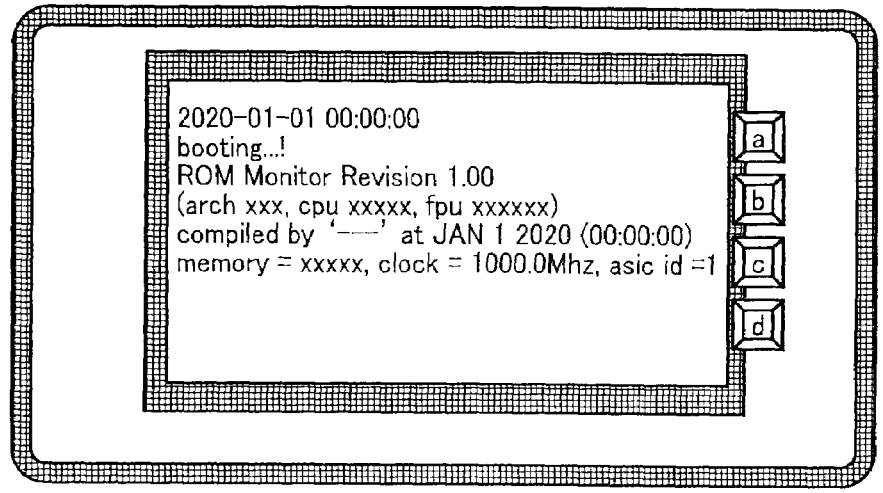

FIGS. 12A to 12C are examples of the screen displayed in the display unit 27. For example, it is possible that only the phrase "acquiring log information" is displayed on the screen as shown in FIG. 12A before the log information is displayed on the screen, and when the user presses the buttons a and b whereby the interrupt operation is performed, the display unit 27 displays the word "authenticating" on the screen as shown in FIG. 12B before Step S41 of the interrupt process shown in FIG. 11. Furthermore, it is possible that, if the user continuously presses the buttons c and d while pressing the buttons a and b (the operation of pressing the buttons is displayed on the screen in a manner such that the user can recognize it) whereby the user inputs correct login information such as a password, the user is notified of completion of authentication and the display unit 27 displays the log information on the screen as shown in FIG. 12C after Step S42 shown in FIG. 11. Biometric authentication such as a finger pattern or a key can be used as an authentication method as well as the login information.

As described above, because it is possible to avoid a person other than the user from seeing the log information, leak of important debugging information can be prevented. Therefore, it is easier to perform an operation of acquiring the log information for a long time at a place (an office of the user, or the like) where the image processing apparatus 1 is installed.

Figure 13:
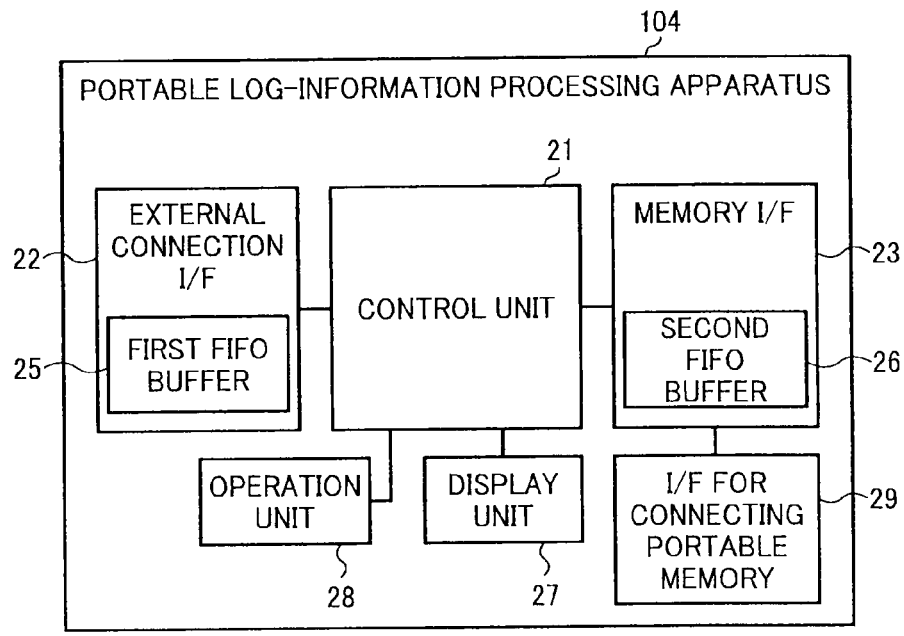
FIG. 13 is a block diagram of a portable log-information processing apparatus according to a fifth embodiment of the present invention.

FIG. 13 is a block diagram of a portable log-information processing apparatus 104 according to the fifth embodiment of the present invention. The same components as those shown in FIG. 8 are indicated with the same reference numerals. The portable log-information processing apparatus 104 includes an I/F 29 for connecting a portable memory (not shown) that is connected to the memory I/F 23 instead of the nonvolatile memory 24 included in the portable log-information processing apparatus 103. Alternatively, it is possible that the portable log-information processing apparatus 104 includes the I/F 29 connected to the memory I/F 23 in addition to the nonvolatile memory 24.

The I/F 29 includes, for example, a secure digital (SD) card connector (not shown) and an electronic component (a capacitor or a resistance) (not shown). It is determined whether the portable memory is connected to the SD card connector, and only when the portable memory is connected to the SD card connector, the log information is written in the portable memory. If it is not determined that the portable memory is connected to the SD card connector, the display unit 27 displays the log information. To notify the user that the portable memory is not connected to the SD card connector, it is always displayed that the portable memory is not connected to the SD card connector on the uppermost portion or the lowermost portion of the screen. Alternatively, it is possible that a light emitting diode (LED) is arranged in the portable log-information processing apparatus 104 and the LED is turned on/off to notify the user that the portable memory is not connected to the SD card connector.

As described above, the acquired log information stored in the portable memory can be carried, thereby improving portability. Moreover, if no available memory is left, the portable memory can be replaced by a new portable memory, thereby improving efficiency of trouble analysis. Furthermore, it is not necessary to store the log information in the PC.

Figure 14:
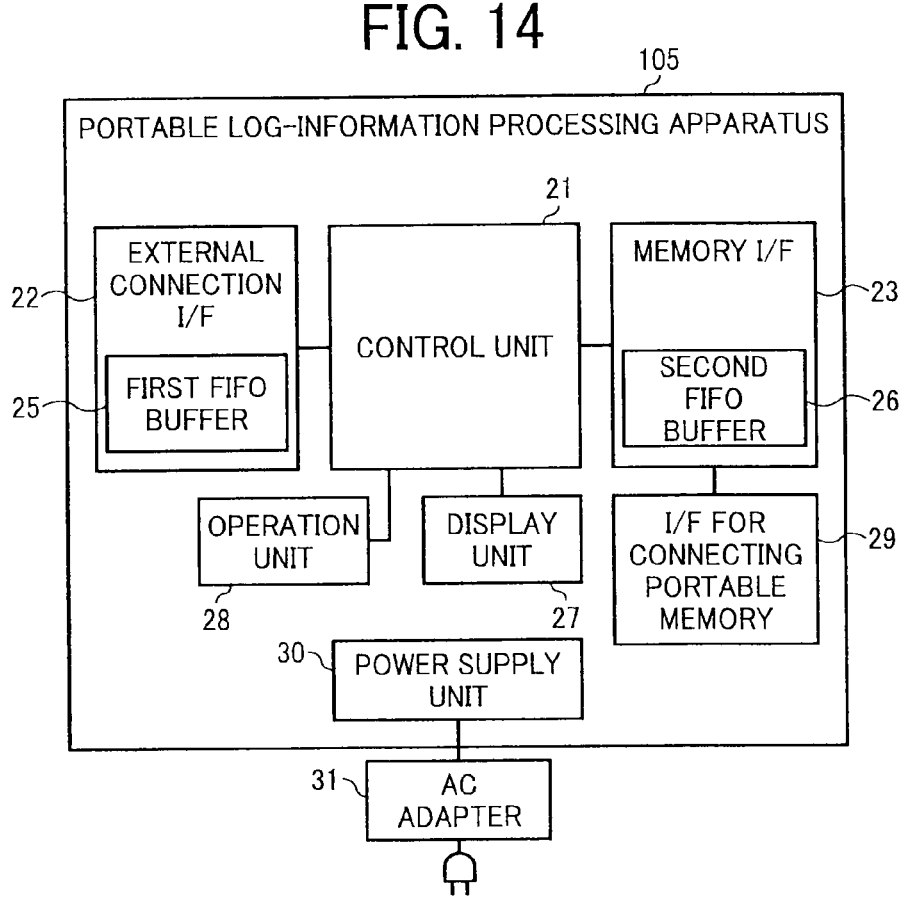
FIG. 14 is a block diagram of a portable log-information processing apparatus according to a sixth embodiment of the present invention.

FIG. 14 is a block diagram of a portable log-information processing apparatus 105 according to the sixth embodiment of the present invention. The same components as those shown in FIG. 13 are indicated with the same reference numerals. The portable log-information processing apparatus 105 includes a power supply unit 30 in addition to the units included in the portable log-information processing apparatus 104, and an output of an alternating current (AC) adapter 31 is input to the power supply unit 30.

The power supply unit 30 changes a voltage of an electric power supplied from the AC adapter 31 and then supplies the electric power to each of the units included in the portable log-information processing apparatus 105. A plug arranged on the input side of the AC adapter 31 is inserted into a socket, and a cord arranged on the output side of the AC adapter 31 is connected to the input side of the power supply unit 30.

Figure 15:
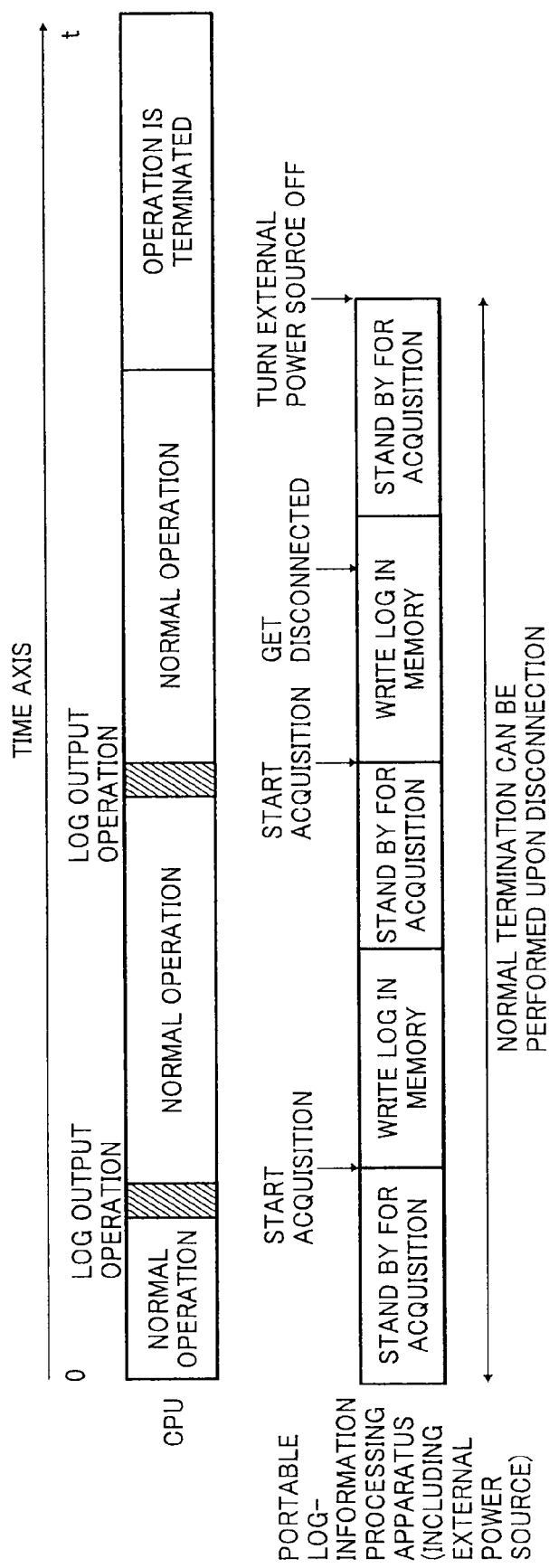
FIG. 15 is a timing chart for explaining an operation performed when the portable log-information processing apparatus according to the sixth embodiment is disconnected from the image processing apparatus.
Figure 16:
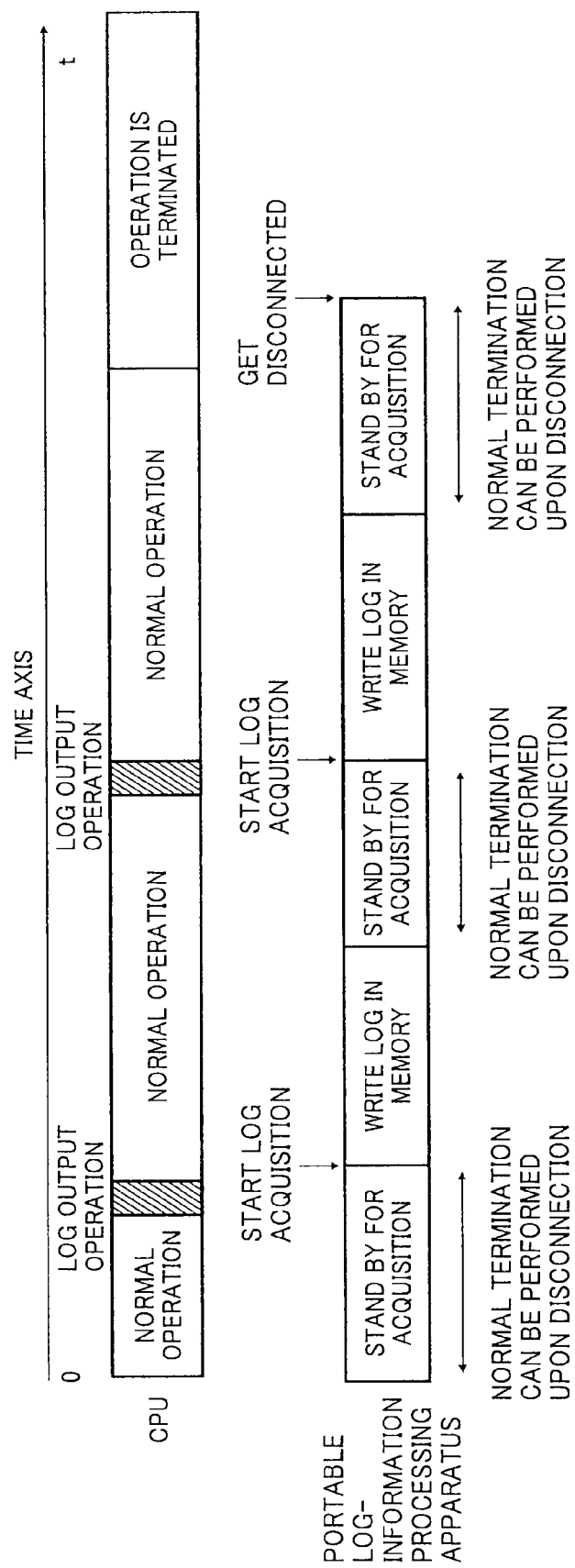
FIG. 16 is a timing chart for explaining an operation performed when the portable log-information processing apparatuses according to the first to the fifth embodiments are disconnected from the image processing apparatus for comparison.

FIG. 15 is a timing chart for explaining an operation performed when the portable log-information processing apparatus 105 is disconnected from the image processing apparatus 1, and FIG. 16 is a timing chart for explaining an operation performed when the portable log-information processing apparatuses 2, 102, 103, 104 according to the first to the fifth embodiments are disconnected from the image processing apparatus 1 for comparison.

In the first to the fifth embodiments, because the electric power is supplied from the image processing apparatus 1 to the portable log-information processing apparatus, the portable log-information processing apparatus cannot be operated if the portable log-information processing apparatus is disconnected from the image processing apparatus 1. Therefore, if the portable log-information processing apparatus is disconnected from the image processing apparatus 1 during an operation of writing the log information in the nonvolatile memory 24, the operation of writing the log information is stopped as it is, and if the electric power is supplied to the portable log-information processing apparatus again, the log information is not stored in the RAM included in the control unit 21. Therefore, as shown in FIG. 16, normal termination cannot be performed unless the portable log-information processing apparatus is disconnected from the image processing apparatus 1 when the portable log-information processing apparatus is in the stand-by state to acquire the log information after the operation of writing the log information in the nonvolatile memory 24 is completed. To prevent the portable log-information processing apparatus from being disconnected from the image processing apparatus 1 during the operation of writing the log information in an improper manner, it is necessary to notify the user of timing at which the normal termination can be performed by using the LCD included in the display unit 27 and the LED included in the operation unit 28, or cancel acquisition of the log information by pressing a predetermined switch included in the operation unit 28 and disconnect the portable log-information processing apparatus from the image processing apparatus 1 after the acquisition of the log information is canceled.

On the other hand, because the electric power is supplied from the AC adapter 31 to the portable log-information processing apparatus 105 regardless of whether the portable log-information processing apparatus 105 is connected to the image processing apparatus 1, as shown in FIG. 15, the normal termination can be performed even if the portable log-information processing apparatus 105 is disconnected from the image processing apparatus 1 when the operation of writing the log information in the nonvolatile memory 24 is performed as well as when the portable log-information processing apparatus 105 is in the stand-by state to acquire the log information. If the portable log-information processing apparatus 105 is disconnected from the image processing apparatus 1 during the operation of writing the log information in the nonvolatile memory 24, the portable log-information processing apparatus 105 enters the stand-by state again after the operation of writing the log information is completed. A power supply switch arranged in the operation unit 28, or the like, is turned off, and power supply from the AC adapter 31 that is an external power source is stopped, so that an operation of the portable log-information processing apparatus 105 is terminated.

As described above, even if the image processing apparatus 1 is suddenly turned off, the log information can be stored in a proper manner. Furthermore, the portable log-information processing apparatus 105 can be disconnected from the image processing apparatus 1 at anytime. Moreover, even if it is not desired to supply the electric power from the image processing apparatus 1 to the portable log-information processing apparatus 105 (for example, if the image processing apparatus 1 does not have an enough amount of electric power), the portable log-information processing apparatus 105 can acquire the log information.

Figure 17:
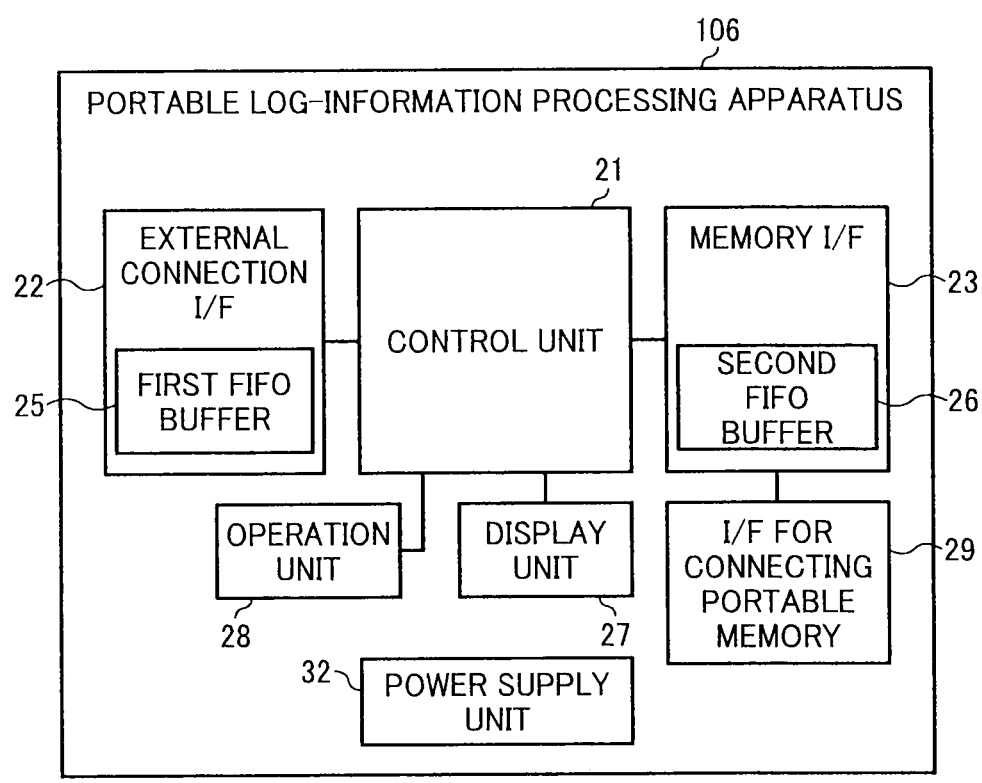
FIG. 17 is a block diagram of a portable log-information processing apparatus according to a seventh embodiment of the present invention.

FIG. 17 is a block diagram of a portable log-information processing apparatus 106 according to the seventh embodiment of the present invention. The same components as those shown in FIG. 14 are indicated with the same reference numerals. The portable log-information processing apparatus 106 further includes a power supply unit 32 having a battery instead of the power supply unit 30 and the AC adapter 31 included in the portable log-information processing apparatus 105.

The power supply unit 32 changes a voltage of an electric power supplied from the battery and then supplies the electric power to each of the units included in the portable log-information processing apparatus 106. Therefore, the log information can be stored in a proper manner even in case of failure of power supply such as temporary blackout.

Alternatively, it is possible that the portable log-information processing apparatus 106 further includes the power supply unit 30 and the AC adapter 31, the portable log-information processing apparatus 106 receives the electric power from the image processing apparatus 1 in the same manner as in the first to the fifth embodiments, the power supply unit 32 includes the battery, a power supply switch included in the power supply unit 32 is turned on, and only when the electric power is not supplied from the image processing apparatus 1 or the AC adapter 31, the electric power is automatically supplied from the power supply unit 32 to the portable log-information processing apparatus 106.

A computer program for processing log information executed by the portable log-information processing apparatus can be provided such that the computer program is previously incorporated in a ROM or the like.

The computer program can be stored, in a form of a file that is installable and executable on a computer, in a recording medium readable by the computer, such as a compact disk-read only memory (CD-ROM), a flexible disk (FD), a CD recordable (CD-R), and a digital versatile disk (DVD).

On the other hand, the computer program can be stored in another computer connected to the computer via a network such as the Internet, and downloaded to the computer via the network. Furthermore, the computer program can also be provided or distributed through a network such as the Internet.

The computer program has a module configuration including the units described above. As actual hardware, the CPU (processor) reads the computer program from the ROM and executes the read computer program to load the units into a main storage so that the units are generated on the main storage.

According to an aspect of the present invention, when the log information is acquired from the image processing apparatus without connecting the PC to the image processing apparatus, the image processing apparatus does not need to include a specialized computer program for writing the log information, and the operation of the image processing apparatus is not affected by the operation of acquiring the log information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A log-information processing apparatus comprising:
a first storage unit;
a first interface device that is attachable and removable to and from an image processing apparatus and, when connected to the image processing apparatus, stores log information output from the image processing apparatus, in the first storage unit;
a second storage unit;
a third storage unit; and
a control unit, implemented by processing circuitry, that, when the first interface device is connected to the image processing apparatus, is configured to perform initialization on units included in the log-information processing apparatus, sends, when unsent log information is stored in the first storage unit, the log information from the first storage unit to the second storage unit, and stores the log information sent to the second storage unit, in the third storage unit.

2. The log-information processing apparatus according to claim 1, further comprising a display unit that displays the acquired log information.

3. The log-information processing apparatus according to claim 2, further comprising an operation unit that receives an input of an operation from a user, wherein
the control unit turns the display unit on/off based on a predetermined input received from the operation unit.

4. The log-information processing apparatus according to claim 3, wherein when the predetermined input is received from the operation unit, the control unit controls the display unit to display the acquired log information.

5. The log-information processing apparatus according to claim 3, wherein
the first storage unit stores therein flag information based on the predetermined input received from the operation unit, and
when a predetermined value is set to the flag information, the control unit controls the display unit to display the acquired log information.

6. The log-information processing apparatus according to claim 5, wherein when the predetermined input is received from the operation unit, the control unit sets the predetermined value to the flag information.

7. The log-information processing apparatus according to claim 1, further comprising a second interface device to which a portable nonvolatile storage medium is configured to be attached and removed to and from, wherein
the control unit writes the acquired log information in the portable nonvolatile storage medium via the second interface device.

8. The log-information processing apparatus according to claim 1, further comprising a power supply unit that supplies electric power to the log-information processing apparatus.

9. The log-information processing apparatus according to claim 8, wherein the power supply unit supplies alternating-current power to the log-information processing apparatus.

10. The log-information processing apparatus according to claim 8, wherein the power supply unit includes a battery.

11. The log-information processing apparatus according to claim 1, wherein
the control unit acquires the log information from the image processing apparatus in direct response to the log information being generated by the image processing apparatus.

12. The log-information processing apparatus according to claim 1, wherein the first interface device directly and electrically connects to a signal line that outputs the log information from a central microprocessor of the image processing apparatus, where the signal line is directly connected to the central microprocessor of the image processing apparatus.

13. The log-information processing apparatus according to claim 1, wherein the first interface device is attachable and removable to and from an image processing apparatus by way of a wired connector.

14. A log-information processing method implemented on a log-information processing apparatus, the log-information processing apparatus including, first, second and third storage units and a first interface unit that is attachable and removable to and from an image processing apparatus and, when connected to the image processing apparatus, stores log information output from the image processing apparatus, in the first storage unit, the log-information processing method comprising:
performing initialization, when the first interface unit is connected to the image processing apparatus, on units included in the log-information processing apparatus;
sending, when unsent log information is stored in the first storage unit, the log information from the first storage unit to the second storage unit; and
storing the log information sent to the second storage unit, in the third storage unit.

15. A computer-readable recording medium storing a computer program containing computer program codes which when executed on a computer cause the computer to implement a log-information processing method on a log-information processing apparatus, the log-information processing apparatus including first, second and third storage units and a first interface unit that is attachable and removable to and from an image processing apparatus and, when connected to the image processing apparatus, stores log information output from the image processing apparatus, in the first storage unit, the method comprising:
performing initialization, when the first interface unit is connected to the image processing apparatus, on units included in the log-information processing apparatus;
sending, when unsent log information is stored in the first storage unit, the log information from the first storage unit to the second storage unit; and
storing the log information sent to the second storage unit, in the third storage unit.

* * * * *